July 25, 1939.     A. H. LANSER     2,167,118
CLUTCH CONTROL
Filed Feb. 6, 1937     2 Sheets-Sheet 1
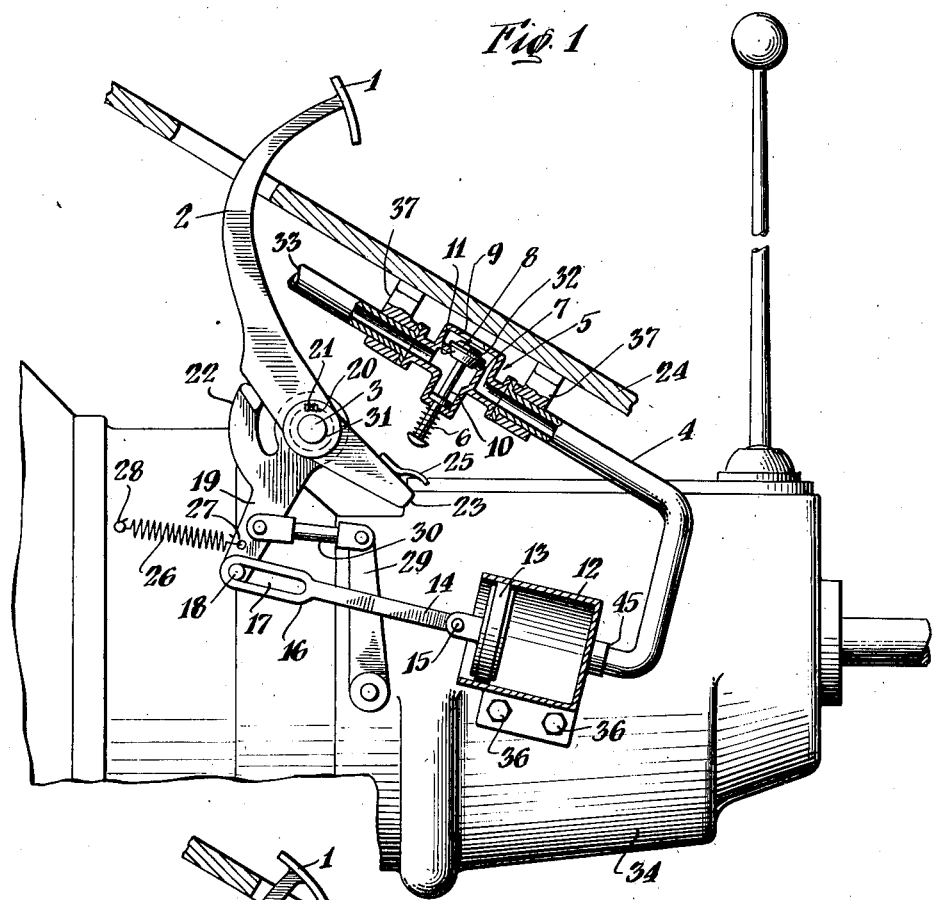
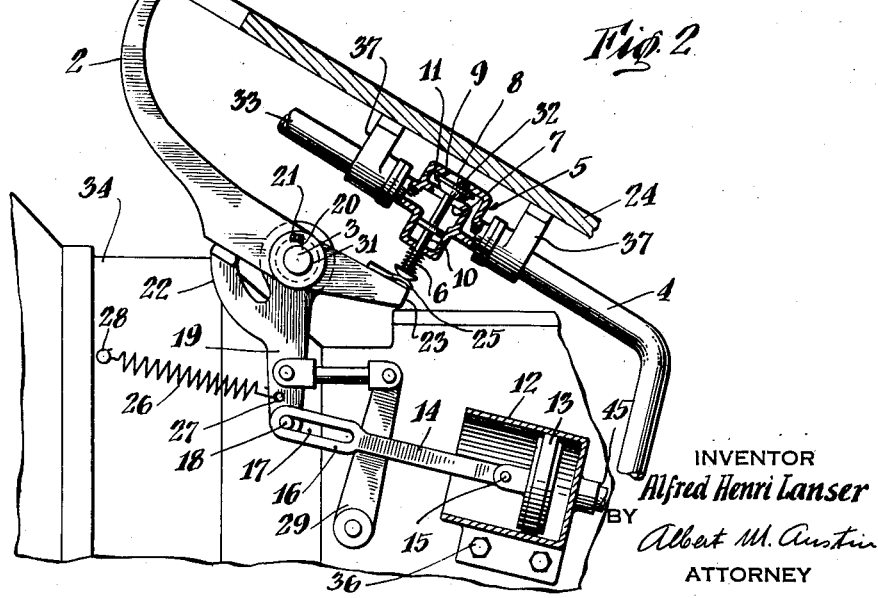
INVENTOR
*Alfred Henri Lanser*
BY
*Albert M. Austin*
ATTORNEY July 25, 1939.  A. H. LANSER  2,167,118
CLUTCH CONTROL
Filed Feb. 6, 1937  2 Sheets-Sheet 2

INVENTOR
Alfred Henri Lanser
BY
Albert M. Austin
ATTORNEY

Patented July 25, 1939

2,167,118

UNITED STATES PATENT OFFICE 2,167,118

CLUTCH CONTROL

Alfred Henri Lanser, Paris, France

Application February 6, 1937, Serial No. 124,381

3 Claims. (Cl. 192—91)

The present invention relates to clutch devices and more particularly to a new and improved booster mechanism for aiding in maintaining mechanical clutches in disengagement.

With the intense traffic which exists in cities and the larger towns and the frequent stops of indefinite duration, it is desirable to be able to start cars rapidly. In order to do this cars are generally stopped in gear with the clutch disengaged. In this manner one avoids the delay incident to engaging the gear after the signal has been given to go ahead and merely has to release the foot from the clutch to get a rapid start.

While this is desirable to expedite starting, it is also quite tiresome because, in order to engage the clutch and hold it firmly in position, the clutch lever is provided with a strong spring against the force of which one must push during the entire time that the car is stopped in gear. The present invention is designed to avoid the fatigue resulting from maintaining the clutch pedal depressed in its disengaged position at each stop.

This invention provides for a booster actuated by the clutch pedal in such a way that it preferably comes into play only when the clutch pedal is pressed down to substantially its limiting position. In this way the clutch pedal acts like all normal pedals when one actuates it in the regular fashion, but by pushing it substantially all the way to the floor boards, it causes a booster action to come into play which takes the part of the force exerted by the leg and it is only necessary to maintain a very small pressure, such as the mere weight of one's foot, to keep the clutch disengaged. Thus one can leave the gear shift lever in first or whatever gear it is desirable to start in and be ready to start up again immediately upon the signal. To do this one merely removes the foot and the pedal may immediately act as an ordinary clutch pedal.

A feature of this invention is that it reduces to a minimum the force which has to be exerted to retain the clutch in disengagement.

Another feature of this invention is that when the clutch has been disengaged, its speed of re-engagement may be controlled.

A further feature of the invention is that the device for controlling the speed of re-engagement ordinarily acts only when the machine is stopped.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 shows one form of device embodying the invention;

Fig. 2 shows the form of device shown in Fig. 1 in another position;

Figure 3:
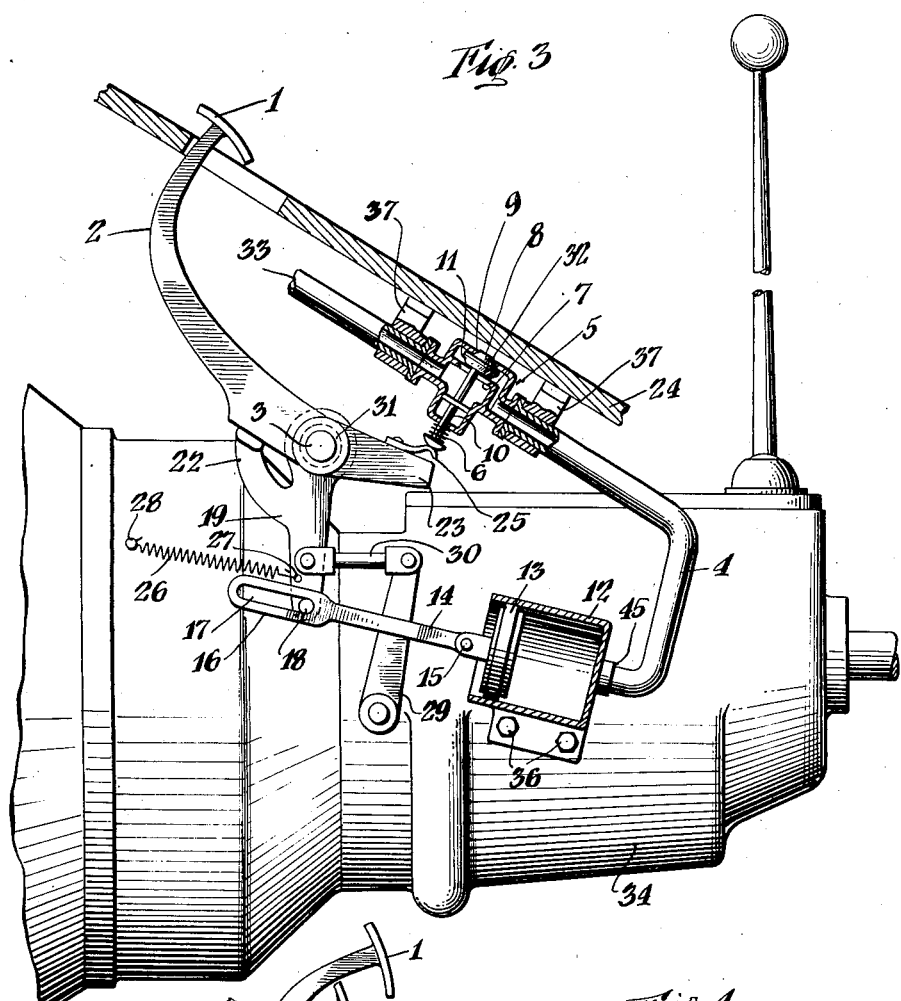
Fig. 3 shows the form of device shown in Figs. 1 and 2 in another position.

In the following description and in the claims, various details will be identified by specific names for convenience, but they are intended to be as generic in their application as the art will permit. Like reference characters denote like parts in the several figures of the drawings.

Referring now to the drawings, and particularly to Figs. 1, 2 and 3, the device comprises broadly a clutch pedal 1, a power control valve 5, a power operated piston 13 and piston rod 14 connected to a clutch lever arm 19, controlling a clutch not shown but contained in a clutch housing 34.

The clutch pedal 1 has a shank portion 2 pivotally mounted as at 31 on a clutch bar 3. The shank may be keyed onto the clutch bar 3 by a tooth portion 21 projecting into a notch 20 in the bar 3. The notch 20 is preferably larger than the tooth 21 in order to provide play between the clutch bar 3 and the clutch shank 2. The clutch shank 2 may extend beyond the pivot point thus providing an extension portion 23 on one face of which may be mounted a spring 25, the purpose of which will be hereinafter described.

A tube 4 connected at one end with a source of energy, designated herein as 33, and at the other end with a cylinder 12, as at 45, has a double action valve 5 interposed therein. This valve comprises a valve spring 6, a valve stem 10, a valve head 8 with opposite faces 11 and 32 and corresponding seats 7 and 9. This valve may be connected to the frame or other part of the machine as at 37.

A cylinder 12 which may be attached to the machine as at 36 has a piston 13 with a piston rod 14 connected by the usual bearing such as 15. The other end 16 of the rod has an opening therein providing a slot 17.

Into the slot 17 on the end of the piston rod projects a stud 18 near one end of a clutch lever arm 19 which may be positively joined to the clutch control bar 3. A spring 26 attached at one end to a fixed point such as 28 connects with the clutch lever arm 19 as at 27 and serves to hold it in a predetermined position. By any desirable means such as the arms 29 and 30 the clutch lever arm 19 is operatively connected to the clutch. From any desired point on the clutch lever arm a finger piece 22 adapted to contact the clutch pedal shank 2 projects.

The apparatus as shown in Fig. 1 is in the position where the clutch is engaged. To disengage the clutch the pedal 1 is depressed substantially to the floor boards as shown in Fig. 3. As the pedal approaches its limiting position the spring 25 on the clutch shank contacts the valve stem 10 and moves the valve head 8 to the position shown in Fig. 3, which is here called the open position. This connects the cylinder 12 with the source of energy 33 which moves the piston 13 to its lower limit as shown in Fig. 2, thus bringing the piston rod 14 back to bear upon the stud 18 and hold the clutch lever against the force tending to return it to its normal position, exerted by the spring 26.

It can be seen that in disengaging the clutch, sufficient pressure must be exerted to overcome the tension of the spring 26 which holds the clutch in engagement. The stronger this spring is, the less the chance of the clutch slipping. Thus, until the clutch has been disengaged, the pressure required is considerable, but as soon as disengagement is effected the valve 5 is opened and the energy overcomes the effect of the spring 26 and holds the clutch in disengagement without application of but the slight amount of pressure necessary to depress the valve 5. Since this valve needs but a small spring 6 to operate it, this pressure is negligible.

When the valve 5 has been closed and the piston 13 energized and the valve is then allowed to be opened, it can be seen that the opening provided by the valve seat will not necessarily permit the flow of sufficient air to immediately and completely release the piston 13 as the area of the cylinder 12 is considerably larger than the opening defined by the valve seat. As a result the piston will be retarded in its movement to the position where the clutch is re-engaged.

This effect, however, is not ordinarily obtained except when the car is stopped as the ordinary driver when shifting gears does not depress the clutch pedal all the way to the floor boards but only enough to disengage the clutch. As is shown in the drawings, spring 25 on the clutch pedal shank does not engage the valve 5 until the clutch pedal 1 is substantially against the floor boards, thus in the ordinary shift the valve 5 will not be actuated and the clutch control bar will be free to operate in the normal manner. Furthermore, even if the valve 5 should be momentarily contacted, because of the valve spring 6 and the spring 25 on the clutch pedal shank 2, the valve would not be immediately actuated.

In order not to have to hold the foot rigidly on the clutch pedal 1, I have provided the spring 25. Thus a certain degree of play may be provided before the valve 5 is released. This also prevents actuation of the booster means when shifting if the clutch pedal be depressed too far, for it can be seen that since the spring 25 has a tendency to give as it contacts the valve stem it will not immediately move the valve to energize the piston 13.

Figure 4:
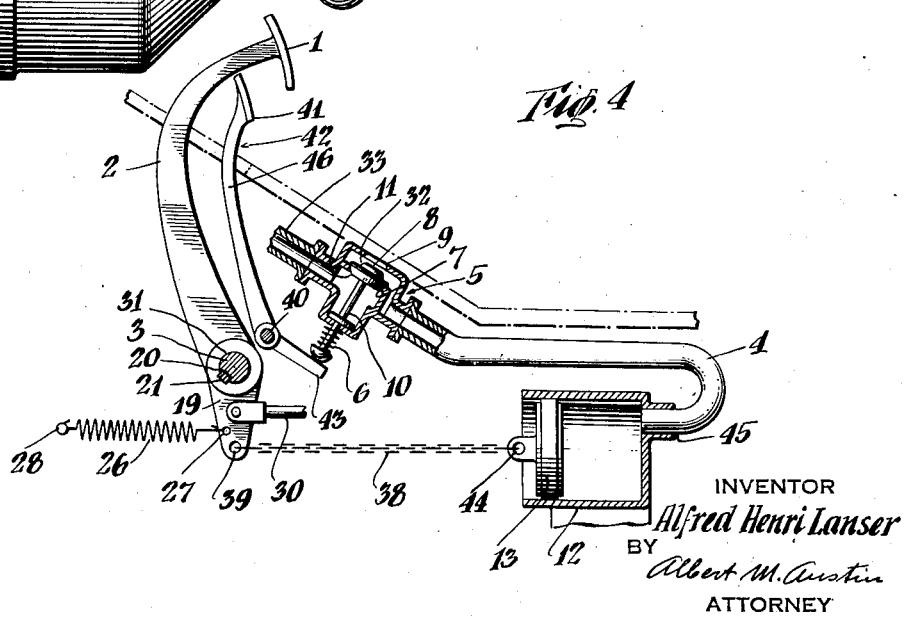
Fig. 4 shows a modified form of device embodying the invention.

While in Figs. 1, 2 and 4 I have shown the clutch pedal shank 2 as being keyed onto the clutch control bar 3 with some play therebetween it is obvious that it may be mounted thereon so as to revolve freely thereabout as shown in Fig. 3, exerting its force to disengage the clutch through a finger piece such as 22.

When the clutch has been disengaged and it is desired to re-engage it, pressure is removed from the clutch pedal. The force of the valve spring 5 then closes the valve 6 and interrupts the energy supplied to the cylinder 12 thus allowing the spring 26 to re-engage the clutch. As the clutch lever 19 moves back to its engaged position the finger 22 pushes the clutch pedal 1 up to its normal position. Also, in event the clutch pedal shank is keyed onto the clutch control bar 3, it is obvious the clutch pedal will be raised as the clutch control bar is turned by the clutch lever 19.

The speed of re-engagement may be controlled by pressure on the clutch pedal 1 or by providing a dash pot action on the piston 13. This may be provided by limiting the size of the valve head at 9 and the corresponding valve seat 32.

Since rapid re-engagement is desired in shifting once the machine has been put in motion, it is not desirable to have the dash pot action at all times. Ordinarily in shifting gears one does not depress the clutch pedal all the way, or approximately all the way. Since my device may be so constructed as to be inoperative unless the clutch pedal is depressed substantially all the way it is obvious no dash pot action will occur in ordinary shifts.

In Fig. 4 I have shown a modification of the device which operates in substantially the same manner as does the device as shown in Figs. 1, 2 and 3. In the device as shown in Fig. 4, instead of the clutch pedal 2 contacting the valve 5 I have interposed a lever 42 which is adapted to be actuated by the clutch pedal to control the valve.

The lever member 42 comprises generally a face portion 41, a shank portion 46 and a branch 43. This lever may be pivoted as at 40 in such a manner that the face portion 41 is adapted to be contacted by the clutch pedal 1 and have its shank 43 contact the valve stem 10.

When it is desired to disengage the clutch, the clutch pedal 1 is depressed, thus directly controlling the clutch mechanism. As soon as the clutch pedal has arrived at its disengaged position it contacts the face 41 of the lever 42 which pivots so that the shank portion 43 contacts the valve stem 10 to open the valve 5 thus energizing the piston 13 to aid in holding the clutch in disengagement as heretofore described.

In the device as shown in Fig. 4 I have substituted the chain 38 for the piston rod 14 shown in the other forms of the device. This chain 38 is attached to the piston 13 as at 44 and to the clutch lever arm 19 at 39.

I have omitted from this form the finger piece 22 it being obvious that with the clutch lever arm fixed to the clutch bar 3 and the clutch pedal 1 being loosely keyed to this bar that as the clutch lever arm is pulled to engaged position by the spring 26 it will turn the clutch bar 3 and in turn move the clutch pedal back to its engaged position. Furthermore, since the clutch pedal 1 is loosely keyed to the clutch bar 3 or freely splined thereto it may move sufficiently to permit the valve 5 to shut off the energy from this piston 13.

Thus it may be seen that I have provided a device which is simple in construction and adaptable to cars now being made or to those heretofore constructed. It relieves the strain incident to maintaining the clutch in disengagement. Furthermore, this is done without adding any burden to the driver, in fact, except for the ease of operation, a driver might be completely oblivious to the presence of the device.

What is claimed is:

1. In combination with a mechanical clutch member, a clutch pedal for disengaging said clutch member, means for re-engaging said clutch member, a source of power operating through a valve controlled line to energize a piston adapted to prevent re-engagement of said clutch member, means on said clutch pedal for actuating said valve when said clutch pedal is depressed beyond its disengaged position to regulate energization of said piston.

2. In a clutch mechanism the combination of a clutch member and a clutch pedal movable from engaged to disengaged position for mechanically controlling engagement and disengagement of said clutch member with a fluid operated piston operatively connected to said clutch member to retain it in disengaged position, a source of energy connected with said piston member, a valve interposed between said source of energy and said piston for controlling the energization of said piston, a lever adapted to contact said valve to control operation of said valve, said lever being actuated by movement of said clutch pedal to beyond its disengaged position.

3. In a clutch mechanism the combination of a clutch member and a manually operated clutch pedal movable from engaged to disengaged position for mechanically operating said clutch and controlling engagement and disengagement thereof with a power operated mechanism operably connected to said clutch member and adapted to retain said clutch member in disengaged position when said clutch pedal is depressed to its disengaged position, a control means for said power operated mechanism, resilient means on said clutch pedal adapted to contact said control means to energize said power means when said clutch pedal is depressed to substantially its extremity and beyond the position where the clutch is disengaged.

ALFRED HENRI LANSER.